Feb. 22, 1966 G. H. HEIM 3,236,529

MECHANICAL SEAL

Filed April 18, 1963

INVENTOR.

GEORGE H. HEIM

BY

ATTORNEY 3,236,529
Patented Feb. 22, 1966

3,236,529

MECHANICAL SEAL

George H. Heim, Phillipsburg, N.J., assignor to Ingersoll-Rand Company, New York, N.Y., a corporation of New Jersey Filed Apr. 18, 1963, Ser. No. 273,956
12 Claims. (Cl. 277—15)

This invention relates to stuffing boxes for pumps, compressors and the like and more particularly to an improved mechanical seal for such stuffing boxes.

Heretofore it has been known in the art of stuffing boxes to employ mechanical seals. In high pressure operation of such mechanical seals, the great variance of pressure across the stationary and rotating seal faces would cause the lubricant to break down and evaporate and thus leave the seal faces void of lubrication. This resulted in high heat, excessive wear and eventual rapid destruction of the seal.

U.S. Patent No. 2,257,011 issued to H. Hillier on September 23, 1941, for Lubricating and Cooling System for the Stuffing Boxes for Pumps and Like Engines attempts to solve the problem of lubricating stuffing boxes in high pressure service by providing a receptacle for a suitable lubricating medium which communicates with the stuffing box to lubricate the stuffing box. This patent does not solve the problem of the great pressure variance across the stuffing box surfaces.

U.S. Patent No. 2,730,386 issued to J. R. Shields on January 10, 1956, for Lubricated Stuffing Box makes use of a multi-stage packing providing a controlled drop in pressure between successive stages of the packing so that there is a controlled differential in pressure across each stage. This method is complex and it is not applicable in use with stuffing boxes employing mechanical seals.

It is the general object of the present invention to avoid and overcome the foregoing and other difficulties of and objections to prior art practices by providing a lubricating film between the stationary and rotating faces of a mechanical seal and sustaining the film under high pressure and temperature conditions.

Another object of the present invention is to provide a means for varying the physical characteristics of the lubricant.

The aforesaid objects of the present invention, and other objects which will become apparent as the description proceeds, are achieved by providing a mechanical seal having a stationary seal face and a rotating seal face. A first means is provided to supply lubricating fluid between said faces. Circulating means are operatively associated with the first means to circulate said lubricating fluid. Cooling means are connected to the circulating means to cool the lubricating fluid. An auxiliary treating assembly is operatively associated with the cooling means to treat the lubricating fluid. The auxiliary treating assembly has a supply reservoir which contains a filming agent. Piping is provided to connect the supply reservoir to the cooling means for the purpose of supplying the filming agent to the lubricating fluid. Further, a second means is operatively associated with the piping to control the proportional resultant percentage mixture of the filming agent and the lubricating fluid. In addition the objects of the present invention are achieved by providing a method for lubricating the seal faces of a mechanical seal, which method includes the steps of supplying lubricating fluid to the seal faces, circulating the lubricating fluid, cooling the lubricating fluid, and adding a filming agent to the lubricating fluid while controlling the percentage of the filming agent in the lubricating fluid.

For a better understanding of the present invention reference should be had to the accompanying drawings, wherein like numerals of reference indicate similar parts throughout the several views and wherein.

Although the principles of the present invention are broadly applicable to mechanical seals in general, the present invention is particularly adapted for use in conjunction with a mechanical seal employed in the stuffing box of a pump used in high pressure service and hence it has been so illustrated and will be so described.

Figure 1:
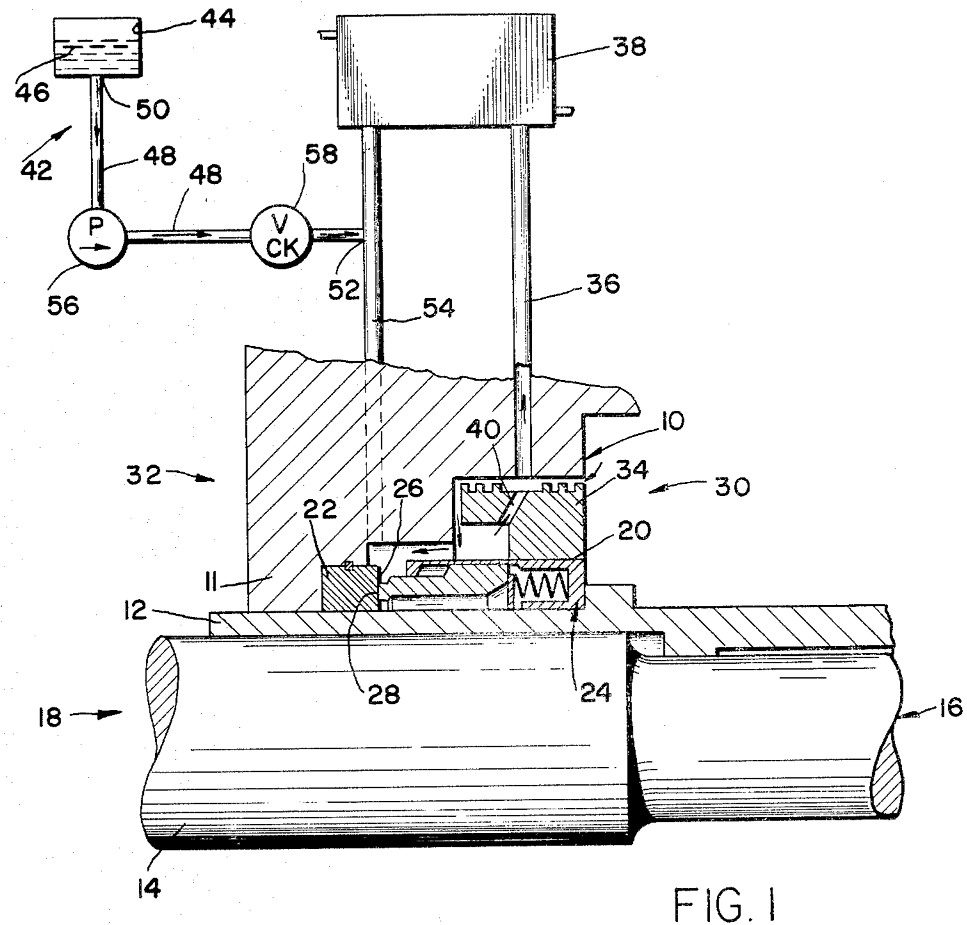
FIGURE 1 is a vertical diagrammatic view of one embodiment of the invention.

With specific reference to the form of the present invention illustrated in the drawings, and referring particularly to FIGURE 1, a stuffing box is indicated generally by the reference numeral 10. The stuffing box 10 has a casing 11 which is disposed around a wedge sleeve 12 of a shaft 14. The stuffing box 10 serves as a dividing seal between a wet side 16 and a dry side 18 of the shaft 14.

On the wet side 16 of the shaft 14 is a standard pump casing (not shown) having an impeller (not shown) for pumping fluids. The pump (not shown) is constructed and arranged for use in high pressure service, such as boiler feed water service. The dry side 18 of the shaft 14 is connected to a standard motor (not shown) to drive the impeller (not shown).

In order to obtain a liquid tight seal between the wet side 16 and the dry side 18 of the shaft 14, a standard mechanical seal 20 is disposed in the casing 11. The mechanical seal 20 is provided with a stationary seal member 22 and a rotating seal assembly 24 disposed adjacently to one another so that a stationary seal face 26 on the stationary seal member 22 and a rotating seal face 28 on the rotating seal assembly 24 mate with one another to provide a liquid tight connection.

The stationary seal face 26 and the rotating seal face 28 are always in constant contact and also are in relative motion with respect to one another. In order to prevent friction failure of the seal faces 26 and 28, the seal faces 26 and 28 are lubricated by lubricating means, such as a diverted portion of the fluid being pumped by the impeller (not shown) using the operating pressure of the pump discharge fluid to force some of the liquid being pumped, back into the stuffing box 10 and between the seal faces 26 and 28 as shown by the arrows in FIG. 1 to lubricate the seal faces 26 and 28.

Figure 2:
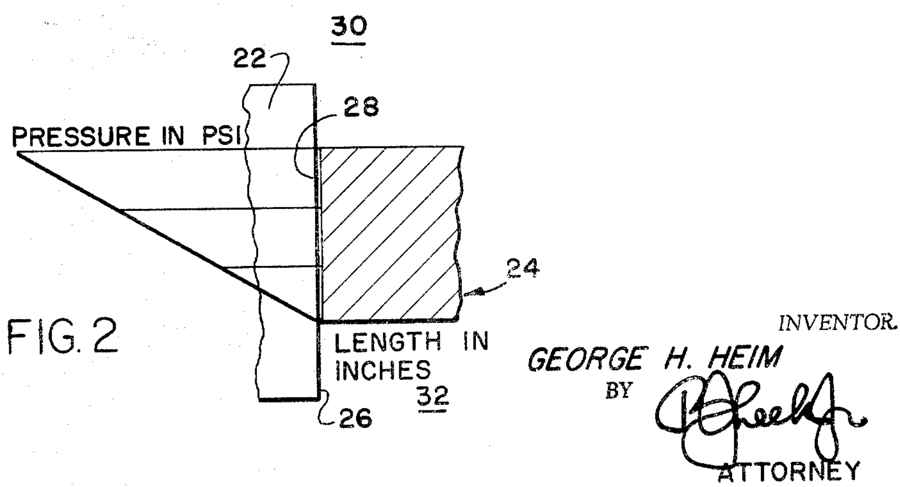
FIGURE 2 is an enlarged fragmentary diagrammatic sectional view of the stationary and rotating faces of a mechanical seal with a graph superimposed thereon and showing the pressure variance across the seal faces.

The seal faces 26 and 28 represent the dividing line between the wet and dry sides 16 and 18 of the stuffing box 10. The seal faces 16 and 18 also represent the dividing line between the high pressure side 30 of the stuffing box which is subjected to the operating pressure of the pump, and the low pressure side 32 of the stuffing box 10, which is at atmospheric pressure (FIGS. 1 and 2).

It will be recognized by those skilled in the art that there is a great pressure drop across the seal faces 26 and 28. The pressure drop across the seal faces, for the purposes of illustration only, is assumed to vary linearly as shown in FIGURE 2. In high pressure service the pressure drop across the seal faces 26 and 28 will be large in the neighborhood of about 1500 p.s.i. In addition, the temperature of the area between the seal faces 26 and 28 is very high such as for example about 300° F. This high temperature is caused by the high pressure, the constant relative motion between the seal faces 26 and 28, and the heat of friction. This combination of high temperature and great pressure drop will cause most lubricating fluids, such as water and oil, to break down and evaporate. This, of course, will leave the area between the seal faces 26 and 28, void of lubrication and thus cause the seal faces 26 and 28 to break down and fail.

In order to cool the lubricant between the seal faces 26 and 28, circulating means, such as a pumping ring 34, and circulating piping 36, operatively associated with a standard cooler 38 are provided. The pumping ring 34 circulates the diverted fluid (which lubricates the seal faces 26 and 28) through impeller holes 40 (FIG. 1) into the circulating piping 36. The circulating piping 36 carries the lubricant through the cooler 38 and back to the stuffing box 10. In this manner the lubricating fluid between the seal faces 26 and 28 is cooled.

In the higher pressure services where the seal faces 26 and 28 are subjected to still higher pressures, the operating temperature between the seal faces 26 and 28 is maintained quite high, with resultant increased pressure gradient across the seal faces 26 and 28 in high pressure service. With these conditions the cooler 38 cannot maintain the circulated lubricating fluid at a temperature sufficiently low to prevent the lubricating fluid between seal faces 26 and 28 from breaking down and evaporating. To prevent the lubricating fluid, in high pressure service, from breaking down and evaporating, an auxiliary treating assembly 42 is utilized (FIGURE 1).

*Auxiliary treating assembly*

The auxiliary treating assembly 42 has a supply reservoir 44 which is supplied with a filming or treating agent 46, such as soap, detergent, etc., which has the ability to mix with the lubricating fluid to raise the evaporating temperature of the lubricating fluid and thus enable the lubricating fluid to withstand the high temperatures and great pressure drop prevailing at the seal faces 26 and 28. The treating agent 46 is delivered to be mixed with the lubricating fluid by auxiliary treating assembly piping 48, connected to the supply reservoir 44 at point 50, which connects the supply reservoir 44 to the circulating piping 36 at a point 52 on the cooler discharge portion 54 of the circulating piping 36.

In order to automatically control the percentage of treating agent mixed with the lubricating fluid, a control means such as a proportioning pump 56 is disposed on the auxiliary treating assembly piping 48. The proportioning pump 56, which, for example, can operate at a fixed speed under constant lubricant loss conditions, will assure that any treating agent 46, that is lost through the inherent fluid losses present in the apparatus or through the overflow (not shown) will be automatically replaced to insure that the lubricating fluid between the seal faces 26 and 28 will always be maintained in the liquid state. In addition, in order to prevent the high pressure maintained in the circulating piping 36 from backing up lubricating fluid into the auxiliary treating assembly piping 48, which is under lower pressure, a check valve 58 is disposed in the auxiliary treating assembly piping 48 just before the auxiliary treating assembly piping 48 is connected to ihe circulating piping 36 at point 52 (FIGURE 1). Thus the lubricating fluid will be maintained in a liquid state and thus will always provide lubrication between the seal faces 26 and 28. In addition, the lubricating fluid will be conditioned to maintain its lubricating characteristics in the high temperature-great pressure drop conditions existing between the seal faces 26 and 28.

*Operation*

Even though it is believed the operation of the apparatus will be apparent from the foregoing description, a brief review of such operation will now be made for purposes of summary and simplification. The operating pressure of the pump (not shown) will divert some of the fluid being pumped between the seal faces 26 and 28, to lubricate the seal faces 26 and 28. The pumping ring 34 will act to circulate the diverted lubricating fluid through the impeller holes 40 and circulating piping 36 to the cooler 38 to cool the lubricating fluid. In addition, the auxiliary treating assembly 42 injects the treating agent 46 into the lubricating fluid to maintain the lubricating fluid in a liquid state.

It will be recognized by those skilled in the art that the objects of the present invention have been achieved by providing a lubricant for the seal faces of a mechanical seal, that will maintain its liquid state in high pressure service and thus provide lubrication to the seal faces to prevent the destruction of the seal faces from the prevailing high temperatures and pressures.

While in accordance with the patent statutes a preferred embodiment of the present invention has been illustrated and described in detail, it is to be particularly understood that the invention is not limited thereto or thereby.

I claim:

1. A mechanical seal having a stationary seal face and a rotating seal face comprising:

(a) a first means to provide lubricating fluid between said faces;

(b) circulating means operatively associated with said first means to circulate said lubricating fluid;

(c) cooling means connected to said circulating means to cool said lubricating fluid, and (d) an auxiliary treating assembly operatively associated with said cooling means to treat said lubricating fluid, said auxiliary treating assembly comprising:

(1) a supply reservoir, (2) said supply reservoir being provided with a filming agent, (3) piping connecting said supply reservoir and said cooling means to supply said filming agent to said lubricating fluid, and (4) a second means operatively associated with said piping to control the proportional resultant percentage mixture of said filming agent and said lubricating fluid.

2. A mechanical seal having a stationary seal face and a rotating seal face comprising:

(a) a first means to provide lubricating fluid between said faces, (b) circulating means operatively associated with said first means to circulate said lubricating fluid, (c) cooling means connected to said circulating means to cool said lubricating fluid, and (d) an auxiliary treating assembly operatively associated with said cooling means to treat said lubricating fluid, said auxiliary treating assembly comprising:

(1) a supply reservoir, (2) said supply reservoir being provided with a filming agent, (3) piping connecting said supply reservoir and said cooling means to supply said filming agent to said lubricating fluid, and (4) a proportioning pump operatively associated with said piping to control the proportional resultant percentage mixture of said filming agent and said lubricating fluid.

3. A mechanical seal having a stationary seal face and a rotating seal face comprising:

(a) a first means to provide lubricating fluid between said faces, (b) circulating means operatively associated with said first means to circulate said lubricating fluid, (c) cooling means connected to said circulating means to cool said lubricating fluid, and (d) an auxiliary treating assembly operatively associated with said cooling means to treat said lubricating fluid, said auxiliary treating assembly comprising:

(1) a supply reservoir, (2) said supply reservoir being provided with a filming agent, (3) piping connecting said supply reservoir and said cooling means to supply said filming agent to said lubricating fluid, and (4) a proportioning pump operatively associated with said piping constantly automatically to control the proportional resultant percentage mixture of said filming agent and said lubricating fluid.

4. A mechanical seal having a stationary seal face and a rotating seal face comprising:

(a) a first means to provide lubricating fluid between said faces, (b) circulating means operatively associated with said first means to circulate said lubricating fluid, (c) cooling means connected to said circulating means to cool said lubricating fluid, and (d) an auxiliary treating assembly operatively associated with said cooling means to treat said lubricating fluid, said auxiliary treating assembly comprising:

(1) a supply reservoir, (2) said supply reservoir being provided with a filming agent, (3) piping connecting said supply reservoir and said cooling means to supply said filming agent to said lubricating fluid, and (4) a proportioning means operatively associated with said piping to constantly automatically control the proportional resultant percentage mixture of said filming agent and said lubricating fluid, and (5) a check valve connected in said piping after said proportioning pump to prevent said lubricating fluid from flowing from said circulating means to said proportioning pump.

5. A stuffing box comprising:

(a) a stuffing box casing;

(b) a rotating shaft through said stuffing box casing;

(c) a shaft sleeve disposed around said shaft to rotate with said shaft;

(d) a stationary seal member disposed in said stuffing box casing;

(e) said stationary seal member being provided with a stationary seal face;

(f) a rotating seal assembly disposed in said stuffing box casing on said shaft sleeve to rotate with said sleeve, said rotating seal assembly being provided with a rotating seal face to communicate with said stationary seal face to form a leak proof connection, (g) lubricating means to provide fluid between said faces to lubricate said faces;

(h) circulating means disposed in said stuffing box casing to circulate said lubricating fluid;

(i) a cooler operatively associated with said circulating means to cool said lubricating fluid; and (j) an auxiliary treating assembly operatively associated with said circulating means to treat said lubricating fluid, said auxiliary treating assembly comprising:

(1) a supply reservoir, (2) said supply reservoir being provided with a filming agent, (3) piping connecting said supply reservoir and said circulating means to supply said filming agent to said lubricating fluid, and (4) control means operatively associated with said piping to control the resultant percentage mixture of said filming agent and said lubricating fluid.

6. A stuffing box comprising:

(a) a stuffing box casing;

(b) a rotating shaft disposed in part through said stuffing box casing;

(c) a shaft sleeve disposed around said shaft to rotate with said shaft;

(d) a stationary seal member disposed in said stuffing box casing;

(e) said stationary seal member being provided with a stationary seal face;

(f) a rotating seal assembly disposed in said stuffing box casing on said shaft sleeve to rotate with said sleeve, said rotating seal assembly being provided with a rotating seal face to communicate with said stationary seal face to form a leak proof connection, (g) lubricating means to provide fluid between said faces to lubricate said faces;

(h) circulating means disposed in said stuffing box casing to circulate said lubricating fluid;

(i) a cooler operatively associated with said circulating means to cool said lubricating fluid; and (j) an auxiliary treating assembly operatively associated with said circulating means to treat said lubricating fluid; said auxiliary treating assembly comprising:

(1) a supply reservoir, (2) said supply reservoir being provided with a filming agent, (3) piping connecting said supply reservoir and said circulating means to supply said filming agent to said lubricating fluid, and (4) a proportioning pump operatively associated with said piping to control the resultant percentage mixture of said filming agent and said lubricating fluid.

7. A stuffing box comprising:

(a) a stuffing box casing;

(b) a rotating shaft disposed in part through said stuffing box casing;

(c) a shaft sleeve disposed around said shaft to rotate with said shaft;

(d) a stationary seal member disposed in said stuffing box casing;

(e) said stationary seal member being provided with a stationary seal face;

(f) a rotating seal assembly disposed in said stuffing box casing on said shaft sleeve to rotate with said sleeve, said rotating seal assembly being provided with a rotating seal face to communicate with said stationary seal face to form a leak proof connection;

(g) lubricating means to provide fluid between said faces to lubricate said faces;

(h) circulating means disposed in said stuffing box casing to circulate said lubricating fluid;

(i) a cooler operatively associated with said circulating means to cool said lubricating fluid; and (j) an auxiliary treating assembly operatively associated with said circulating means to treat said lubricating fluid, said auxiliary treating assembly comprising:

(1) a supply reservoir, (2) said supply reservoir being provided with a filming agent, (3) piping connecting said supply reservoir and said circulating means to supply said filming agent to said lubricating fluid, and (4) a proportioning pump operatively associated with said piping to constantly automatically control the resultant percentage mixture of said filming agent and said lubricating fluid.

8. A stuffing box comprising:

(a) a stuffing box casing;

(b) a rotating shaft disposed in part through said stuffing box casing;

(c) a shaft sleeve disposed around said shaft to rotate with said shaft;

(d) a stationary seal member disposed in said stuffing box casing;

(e) said stationary seal member being provided with a stationary seal face;

(f) a rotating seal assembly disposed in said stuffing box casing on said shaft sleeve to rotate with said sleeve, said rotating seal assembly being provided with a rotating seal face to communicate with said stationary seal face to form a leak proof connection;

(g) lubricating means to provide fluid between said faces to lubricate said faces;

(h) circulating means disposed in said stuffing box casing to circulate said lubricating fluid;

(i) a cooler operatively associated with said circulating means to cool said lubricating fluid; and (j) an auxiliary treating assembly operatively associated with said circulating means to treat said lubricating fluid, said auxiliary treating assembly comprising:

(1) a supply reservoir, (2) said supply reservoir being provided with a filming agent, (3) piping connecting said supply reservoir and said circulating means to supply said filming agent to said lubricating fluid, and (4) a proportioning pump operatively associated with said piping to constantly automatically control the resultant percentage mixture of said filming agent and said lubricating fluid, and (5) a check valve connected in said piping after said proportioning pump to prevent said lubricating fluid from flowing from said circulating means to said proportioning pump.

9. In combination with a mechanical seal having a stationary seal face, a rotating seal face operatively associated with said stationary seal face to provide a tight seal, means to provide lubricating fluid between said faces and cooling means to cool the lubricating fluid, (a) a supply reservoir disposed adjacent said cooling means and adapted to contain a filming agent;

(b) piping connecting said supply reservoir and said cooling means to supply said filming agent to said lubricating fluid, and (c) means operatively associated with said piping to control the proportional percentage of said filming agent and said lubricating fluid.

10. A mechanical seal having a stationary seal face, a rotating seal face operatively associated with said stationary seal face to provide a tight seal, means to provide lubricating fluid between the faces and cooling means to cool the lubricating fluid, in combination with:

(a) a supply reservoir, said supply reservoir being provided with a filming agent;

(b) piping connecting said supply reservoir and said cooling means to supply said filming agent to said lubricating fluid; and (c) a proportioning pump operatively associated with said piping to control the proportional percentage of said filming agent and said lubricating fluid.

11. A mechanical seal having a stationary seal face, a rotating seal face operatively associated with said stationary seal face to provide a tight seal, means to provide lubricating fluid between the faces and cooling means to cool the lubricating fluid, in combination with:

(a) a supply reservoir, said supply reservoir being provided with a filming agent;

(b) piping connecting said supply reservoir and said cooling means to supply said filming agent to said lubricating fluid; and (c) a proportioning pump operatively associated with said piping to constantly automatically control the proportional percentage of said filming agent and said lubricating fluid.

12. A mechanical seal having a stationary seal face, a rotating seal face operatively associated with said stationary seal face to provide a tight seal, means to provide lubricating fluid between the faces and cooling means to cool the lubricating fluid, in combination with:

(a) a supply reservoir, said supply reservoir being provided with a filming agent;

(b) piping connecting said supply reservoir and said cooling means to supply said filming agent to said lubricating fluid;

(c) a proportioning pump operatively associated with said piping to constantly automatically control the proportional percentage of said filming agent and said lubricating fluid; and (d) a check valve connected in said piping after said proportioning pump to prevent said lubricating fluid from flowing from said cooling means to said proportioning pump.

References Cited by the Examiner

UNITED STATES PATENTS

| | | | |
|---|---|---|---|
| 1,080,894 | 12/1913 | Cruzan | 277—12 |
| 2,257,011 | 9/1941 | Hillier | 277—15 |
| 2,824,759 | 2/1958 | Tracy | 277—15 |
| 2,922,491 | 1/1960 | Macks | 184—1 |
| 3,077,242 | 2/1963 | Clinton et al. | 184—1 |

SAMUEL ROTHBERG, *Primary Examiner.*

E. DOWNS, *Assistant Examiner.*